United States Patent
Skaff et al.

(10) Patent No.: US 7,983,807 B2
(45) Date of Patent: *Jul. 19, 2011

(54) SYSTEM AND METHOD FOR DISPLAYING VEHICLE EFFICIENCY

(75) Inventors: Ryan J. Skaff, Farmington Hills, MI (US); Robert Jay Louch, Highland, MI (US); Anthony Howard, White Lake, MI (US); Stephen Burke, Triadelphia, WV (US); David Watson, Ann Arbor, MI (US); Angela L. Watson, Ann Arbor, MI (US); Derek Hartl, Royal Oak, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,796

(22) Filed: Feb. 24, 2010

(65) Prior Publication Data

US 2010/0152941 A1 Jun. 17, 2010

Related U.S. Application Data

(63) Continuation of application No. 12/259,465, filed on Oct. 28, 2008.

(51) Int. Cl.
*G06F 7/00* (2006.01)

(52) U.S. Cl. .............. 701/22; 701/29; 701/123; 903/903

(58) Field of Classification Search .................... 701/22, 701/29, 70, 123; 903/903, 918, 951; 180/65.265, 180/65.21; 340/425.5, 438, 439, 455–462, 340/636.1–636.19; 307/43; 324/76.11
See application file for complete search history.

(56) References Cited

U.S. PATENT DOCUMENTS

| 6,092,021 | A | 7/2000 | Ehlbeck et al. |
| 6,411,888 | B1 | 6/2002 | Weisman et al. |
| 6,480,106 | B1 | 11/2002 | Crombez et al. |
| 6,600,413 | B1 | 7/2003 | Lo |
| 7,091,839 | B2 | 8/2006 | Situ et al. |
| 2005/0128065 | A1 | 6/2005 | Kolpasky et al. |
| 2007/0208468 | A1 | 9/2007 | Sankaran et al. |
| 2010/0106352 | A1* | 4/2010 | Skaff et al. ............. 701/22 |

FOREIGN PATENT DOCUMENTS

JP 2000247164 A 9/2000

* cited by examiner

*Primary Examiner* — Gertrude Arthur Jeanglaud
(74) *Attorney, Agent, or Firm* — Jennifer Stec; Brooks Kushman P.C.

(57) ABSTRACT

A system and method for determining and displaying an overall efficiency value of a vehicle. The vehicle may include an engine and an electric machine that operates to provide torque to propel the vehicle. In addition, the vehicle may have an electric power source that provides electric power to the electric machine. A controller may determine and transmit the overall efficiency value so that the information display displays the number of efficiency indicators. Also, the number of efficiency indicators displayed may be based on the overall efficiency value.

18 Claims, 4 Drawing Sheets

US 7,983,807 B2

SYSTEM AND METHOD FOR DISPLAYING VEHICLE EFFICIENCY

CROSS-REFERENCE TO RELATED APPLICATIONS

This application is a continuation of U.S. application Ser. No. 12/259,465 filed Oct. 28, 2008, the disclosure of which is hereby incorporated by reference in its entirety.

BACKGROUND

1. Technical Field

One or more embodiments of the present application relate to a system and method for indicating to a driver the overall efficiency of a vehicle.

2. Background Art

Vehicles, whether passenger or commercial, include a number of gauges, indicators, and various other displays to provide the vehicle driver with information regarding the vehicle and its surroundings. With the advent of new technologies, such as hybrid electric vehicles (HEVs), has come a variety of new gauges and information displays that help drivers to better learn the operation of these vehicles that utilize new technology. For example, many HEVs incorporate gauges that attempt to provide the driver with information on the various hybrid driving states. These gauges indicate to the driver when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired driving efficiency, in part because of driving habits. In many cases, drivers are willing to modify their behavior, but are unable to translate recommended techniques into real changes in their driving habits. Moreover, gauges or displays that fail to continually update the driver do not allow the driver to adapt their driving habits so as to achieve the most optimal overall efficiency.

Therefore, a need exists for an information display for a vehicle that facilitates efficient operation of the vehicle by indicating to a driver a direct correlation between vehicle operation and overall efficiency.

BRIEF DESCRIPTION OF THE DRAWINGS

FIG. 2b shows an alternate view of the information display depicted in FIG. 2a;

FIG. 2c shows another alternate view of the information display depicted in FIG. 2a;

DETAILED DESCRIPTION

Figure 1:
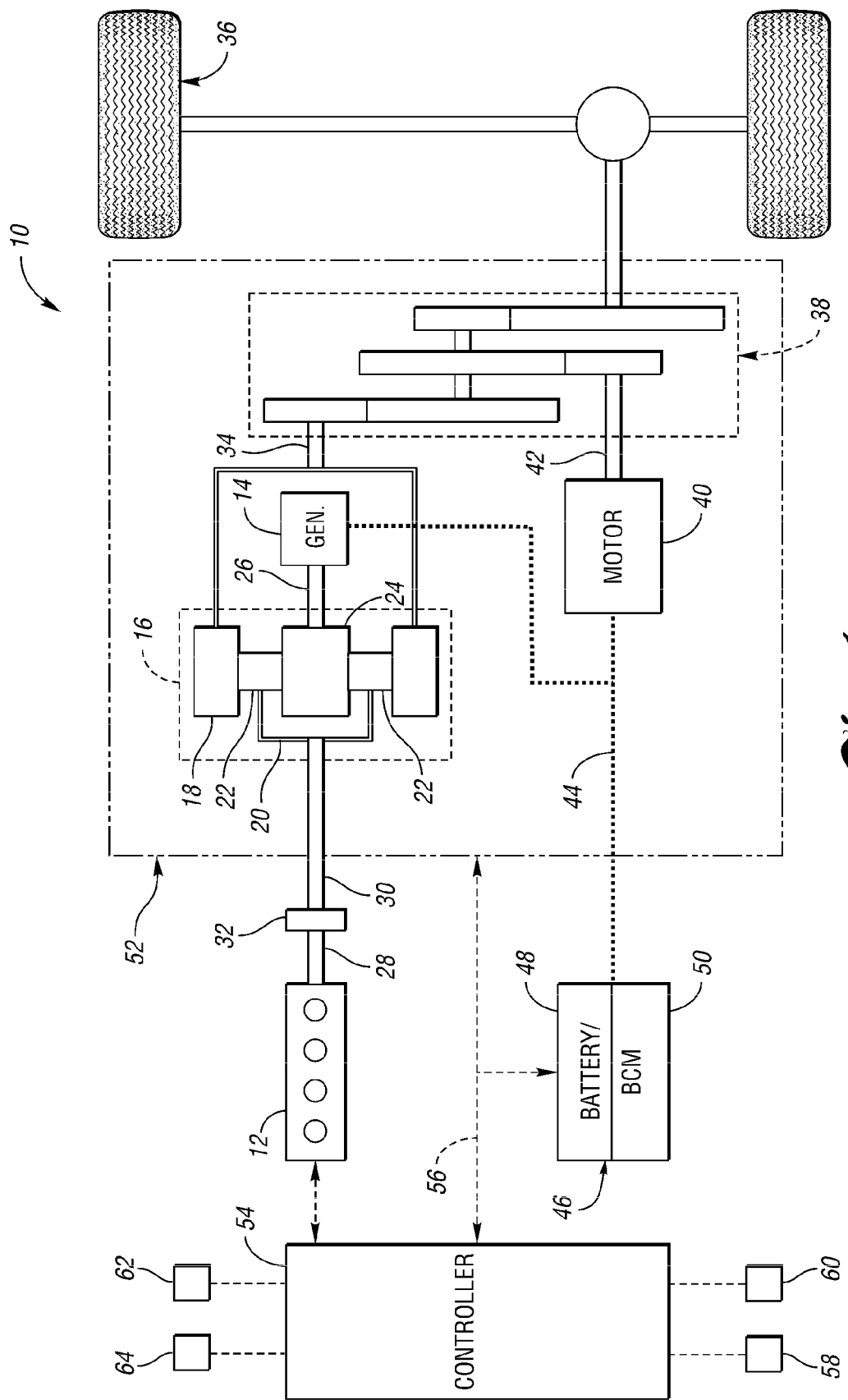
FIG. 1 shows a schematic representation of a hybrid electric vehicle including an information display in accordance with an embodiment of the present application.

FIG. 1 shows a schematic representation of a vehicle 10, which includes an engine 12 and an electric machine, or a generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the one or more embodiments of the present application may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, is provided. Although it is shown as a single controller, it may include multiple controllers which may be used to control multiple vehicle systems. For example, the controller 54 may be a vehicle system controller/powertrain control module (VSC/PCM).

A controller area network (CAN) 56 allows the controller to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is an HEV, it is understood that embodiments of the present application may be implemented on other types of vehicles, such as those powered by an engine or electronic motor alone.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an driver actuated switch, or the automatic control of the air conditioning system 62 based on related functions such as window defrost. In addition to the foregoing, the vehicle 10 includes an information display system 64, which, as explained in detail below, provides efficiency information to the driver of the vehicle 10.

Figure 2C:
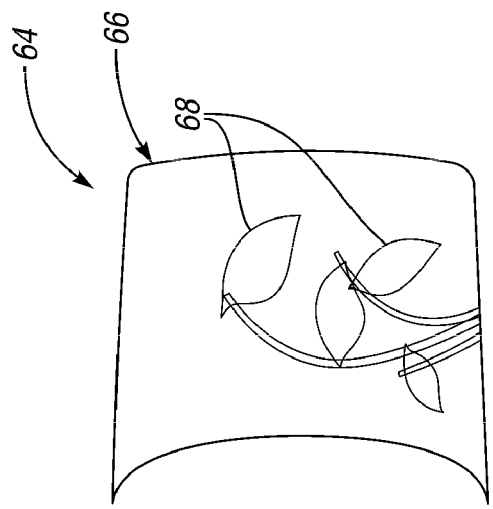
Figure 2B:
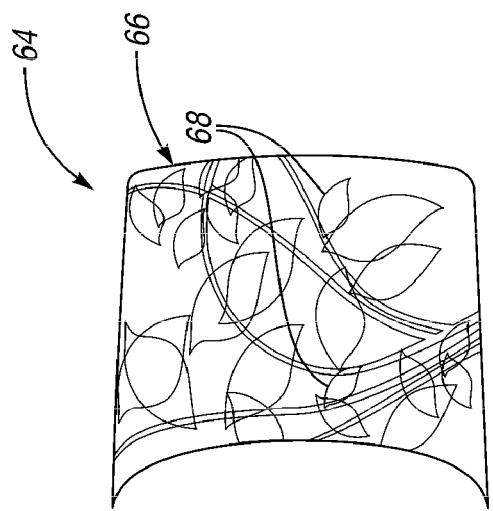
Figure 2A:
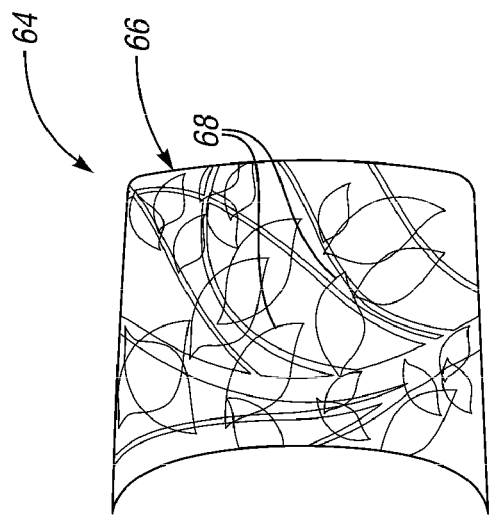
FIG. 2a shows in detail the information display depicted in FIG. 1.

FIG. 2a generally illustrates one embodiment of the information display system 64. The information display system 64 may include an information display 66 and electronics, including software, which are not shown in FIG. 2a. The information display 66 may indicate the efficiency information using any number of analog gauges. Alternatively, the information display 66 may indicate the efficiency information using a liquid crystal display (LCD), a plasma display, an organic light emitting display (OLED) or any other display suitable to display efficiency information.

One or more embodiments of the present application contemplate that the efficiency information indicated to a user may correlate to the user's recent driving habits of the vehicle 10. More particularly, the information display 66 may indicate to a driver an overall efficiency in terms of an amount saved by operating the vehicle 10 in a fuel efficient manner, or in terms of overall energy efficiency.

The overall efficiency may be defined as dollars saved, fuel saved, energy saved, harmful emissions, or the like. By providing efficiency information to the driver, the information display 66 may be used by the driver to modify operation of the vehicle 10 in order to increase the overall efficiency of the vehicle 10. FIGS. 2b and 2c further illustrate the information display 66 as the driver increases the efficiency during operation of the vehicle 10.

The information display 66 may also include a control system, which, for reference purposes, may be the controller 54 described in FIG. 1. The controller 54 may be configured to receive sensed inputs that relate to current operating conditions of the vehicle 10, and the controller 54 may provide outputs to the information display system 64 such that the information display 66 indicates to the driver a current or recent efficiency of the vehicle 10. According to an embodiment of the present application, the efficiency of the vehicle 10 may be displayed using one or more efficiency indicators 68.

As illustrated in FIGS. 2a, 2b, and 2c, the driver may be visually informed when particular vehicle operation results in increased efficiency by increasing the number of efficiency indicators 68 displayed. For example, if the vehicle 10 is operated in a relatively efficient manner, the information display 66 may display more efficiency indicators 68, thereby informing the driver of the improved vehicle operation. Conversely, if the vehicle is operated in an inefficient manner, the information display 66 may reduce the number of efficiency indicators 68 displayed. As such, the information display system 64 may aid the driver in modifying operation of the vehicle 10 in order to acquire an optimal efficiency.

While the efficiency indicators 68 illustrated in FIGS. 2a, 2b and 2c are represented as leaves, one skilled in the art would understand that other efficiency indicators may be provided without departing from the scope of the present application. For example, the information display 66 may display the efficiency indicators 68 as one or more dollar bills. Similar to the usage of leaves, the quantity of dollar bills displayed may increase as the driver operates the vehicle in a more efficient manner. The information display 66 may also use a dollar bill to illustrate efficiency by increasing the numerical value of the dollar bill. Thus, the denomination of the dollar bill may be modified as the vehicle is operated in a more efficient manner.

The information display 66 may also be illustrated in the form of a graph. For example, the information display 66 may be illustrated as a bar graph, wherein the efficiency indicators 68 displayed may illustrate a segment of the bar graph. As such, when the vehicle 10 is operated in an efficient manner, the number of efficiency indicators 68, or segments, may increase. Alternatively, when the vehicle 10 is operated in an inefficient manner, the number of the efficiency indicators 68, or segments, may decrease.

Figure 3:
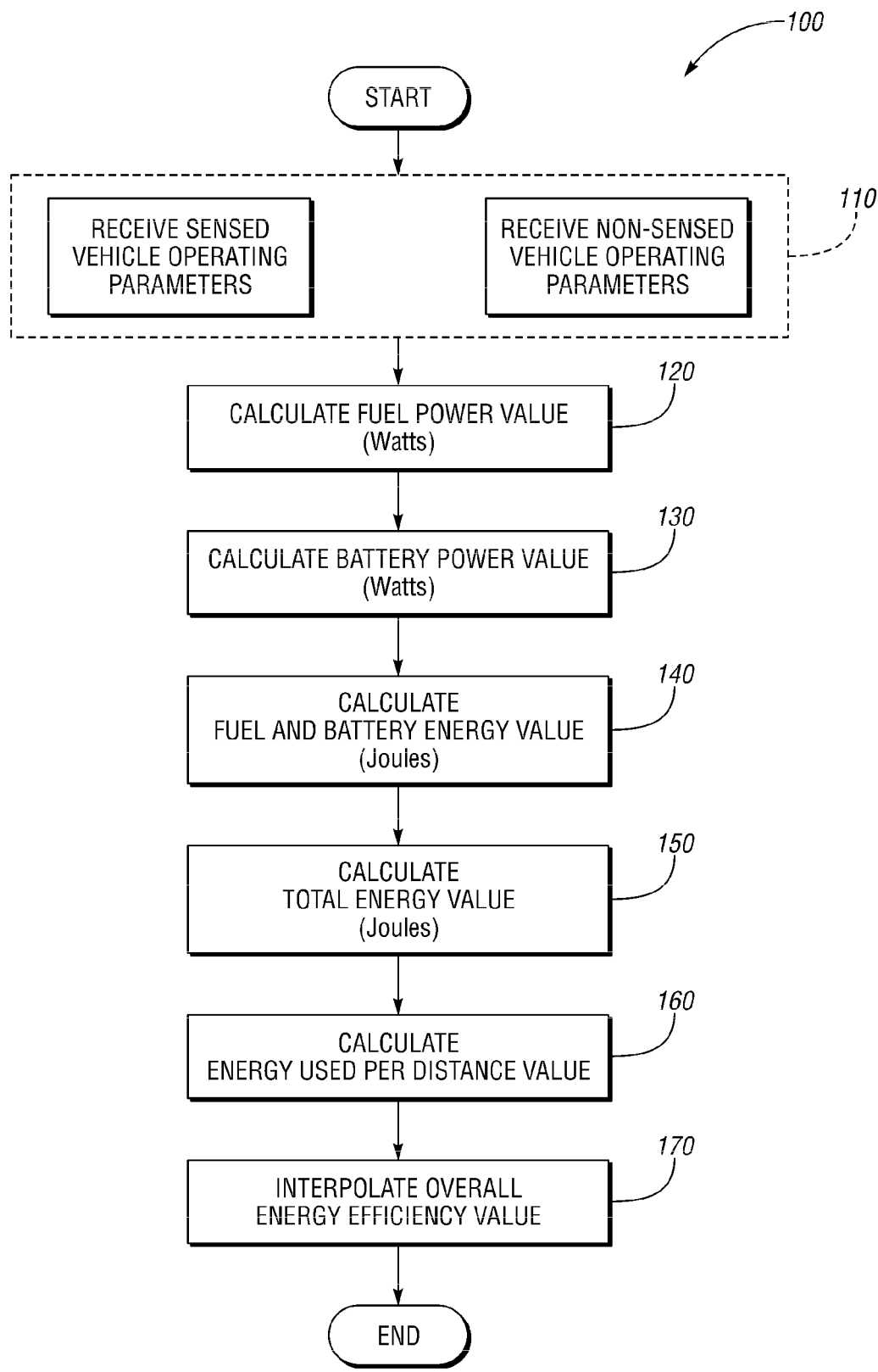
FIG. 3 is a simplified, exemplary flow chart depicting one or more embodiments of the present application described herein.

FIG. 3 illustrates a simplified, exemplary flow diagram 100 demonstrating how an overall efficiency of the vehicle 10 may be determined. The overall energy efficiency of the vehicle 10 may be determined by considering that both the electric machines (generator 14 and motor 40) and the engine 12 may be used to power the vehicle 10. In considering both the amount of fuel and electricity consumed by the engine 12 and the electric machines 14, 40, respectively, the information display 66 more accurately indicates to the driver the overall energy efficiency of the vehicle.

One or more embodiments of the present application further contemplate that the controller 54 may determine the overall energy efficiency as a "short term" energy efficiency value and/or a "long term" energy efficiency value. The "short term" energy efficiency value may be continually determined over a "short term" time period or distance traveled value. As such, the information display 66 may inform the driver as to how the vehicle 10 is being operated over a "short term" time period or a "short term" distance traveled. For example, if the "short term" time period value is five minutes, the "short term" energy efficiency would be determined every five minutes while the vehicle 10 is running. Alternatively, if the "short term" distance traveled value is five miles, the "short term" energy efficiency value would be determined every five miles the vehicle 10 travels.

One or more of the present applications contemplate that the "short term" time period or distance traveled value may operate as a rolling calculation. As such, the "short term" energy efficiency may be determined based upon a rolling predetermined frequency (e.g., a five or ten msec refresh rate). For example, if the "short term" time period is five minutes and the predetermined frequency is five msecs, the "short term" energy efficiency would be determined every five msec. Hence, the "short term" energy efficiency would operate to continually use new information to determine the "short term" energy efficiency and the information display 66 would display the updated "short term" energy efficiency.

One or more embodiments of the present application contemplates that the "short term" time period or distance traveled value may be predetermined. Alternatively, the "short term" time period or distance traveled value may be a user-defined value. The driver may input the user-defined value using a user interface system and the controller 54 may receive and store the user-defined value in memory. The controller 54 may then use the user-defined value in order to determine the "short term" energy efficiency value.

The "long term" energy efficiency value may be determined from the time the vehicle 10 is started until a "long term" end time value has elapsed. Generally, the "long term" end time value may be the time when the vehicle 10 is turned off. As such, the "long term" energy efficiency value would be determined from the time when the vehicle 10 is turned on until the time when the vehicle 10 is turned off. The "long term" energy efficiency value may therefore indicate to a driver the "long term" energy efficiency in terms of a trip or commute.

One or more embodiments of the present application further contemplates that the "long term" end time value may be a "long term" time period or a "long term" distance traveled. Thus, the "long term" energy efficiency value may be determined from the time when the vehicle 10 is turned on until the "long term" time period elapses or until the "long term" distance traveled is reached. For example, if the "long term" time period is twenty minutes, the "long term" energy efficiency value would be determined over the course of twenty minutes starting from the time when the vehicle 10 is turned on. On the other hand, if the "long term" distance traveled value is twenty miles, then the "long term" energy efficiency value would be determined over the course of twenty miles starting from the time when the vehicle 10 is turned on.

The information display 66 may operate to display either the "short term" or "long term" energy efficiency values. Generally, the "short term" energy efficiency value may be obtained by the information display system 64 while the vehicle 10 is being operated. In turn, the information display system 64 may modify the number of efficiency indicators 68 displayed by the information display 66 in response to the obtained "short term" energy efficiency value. The controller 54 may also continue to obtain new short term" energy efficiency values so that the information display 66 continuously updates while the vehicle 10 is being operated.

One or more embodiments of the present application contemplate that the "long term" energy efficiency value may typically be transmitted to the information display 66 when the vehicle is turned off. For example, while the vehicle 10 is operating, the controller 54 may transmit the "short term" energy efficiency value to the information display 66. Then, upon the vehicle 10 being turned off, the controller 54 may transmit the "long term" energy efficiency value to the information display 66. Thus, the information display 66 may display the "short term" energy efficiency value while the vehicle 10 is running and the "long term" energy efficiency value while the vehicle is turned off.

However, one or more embodiments of the present application also contemplate that the "long term" energy efficiency value may be transmitted to the information display 66 at any time. Furthermore, the controller 54 may be preset or the driver may be able to select to display the "long term" energy efficiency value. As such, the controller 54 may transmit the "long term" energy efficiency value to the information display 66 while the vehicle is running and the information display 66 may modify the number of efficiency indicators 68 in respect to the transmitted "long term" energy efficiency value.

Lastly, the controller 54 may be capable of storing any number of previous "long term" energy efficiency values in memory. As such, the driver may be capable of recalling and displaying previous "long term" energy efficiency values on the information display 66. The driver may use the previous "long term" energy efficiency values displayed as a way to improve how efficiently the vehicle 10 is operated. For example, if the driver commutes to work using the same route daily, the driver may review the previous weeks "long term" energy efficiency values that correlate to the drivers daily commute. After reviewing the previous "long term" energy efficiency values, the driver may modify the operation of the vehicle 10 in order to increase the "long term" energy efficiency value during a future daily commute.

With reference back to the FIG. 3, step 110 illustrates that the controller 54 may receive a number of sensed or non-sensed vehicle inputs that correspond to current operating conditions or overall energy efficiency of the vehicle 10. For example, the controller 54 may receive a battery voltage value, a battery current value, a fuel flow rate value, a distance traveled value, an average speed value, or the like.

Once the sensed or non-sensed vehicle inputs are received, the flow diagram 100 may proceed to step 120 where the controller 54 may use the sensed and non-sensed vehicle inputs in order to calculate a fuel power value. The fuel power value may represent the amount of power consumed by the engine 12 in order to power the vehicle 10. In order to calculate the fuel power value, the controller 54 may use the following exemplary equation:

$$\text{Fuel\_Power} = \text{Fuel\_Flow\_Rate} * \text{Energy\_Density} \quad (1)$$

where,

Fuel_Power is the determined fuel power value;

Fuel_Flow_Rate is the received fuel flow rate value that corresponds to the amount of fuel being injected into the engine 12; and Energy_Density is a stored energy density value that corresponds to an amount of energy stored in the vehicle 10 per unit mass.

Equation (1) illustrates that the controller 54 may calculate the fuel power value using a received fuel flow rate value. One or more embodiments of the present application recognize that the fuel flow rate value received by the controller 54 may be the fuel injection flow rate of the engine 12 and may be expressed in terms of pounds per hour (lbs/hr). As such, the fuel flow rate value may correlate to a fuel-air mixture that is injected into the engine 12.

One or more embodiments of the present application also contemplate that the energy density value may be required in order to convert the fuel flow rate value into the fuel power value. As such, the controller 54 may store in memory a look up table having any number of estimated energy density values. The controller 54 may select the estimated energy density value that most closely corresponds to the fuel used by the vehicle 10. For example, one or more embodiments of the present application may recognize that the vehicle 10 uses a standard unleaded fuel mixture that has an energy density value of approximately 42.7 mega-jewel per kilogram (MJ/kg). Thus, the controller 54 may use 42.7 MJ/kg as the energy density value in order to determine the fuel power value of the vehicle 10.

Once the fuel power value has been determined, the flow diagram 100 may proceed to step 130. In step 130, the controller 54 may determine a battery power value using the received battery voltage value and battery current value. Typically, the received battery voltage and battery current values indicate the amount of voltage and current consumed by the vehicle 10. However, one or more embodiments of the present application contemplates that the received battery voltage value and battery current value may account for the amount of voltage and current being consumed from the battery 48 and supplied to the battery 48 while the vehicle 10 is being operated. The battery power value may be determined using the following exemplary equation:

$$Battery\_Power = Battery\_Voltage * Battery\_Current \qquad (2)$$

where,
Battery_Power is the determined battery power value;
Battery_Voltage is the received battery voltage value; and
Battery_Current is the received battery current value.

Once the battery power value is determined, the flow diagram 100 may proceed to step 140. In step 140, the controller 54 may use the determined fuel power value from Equation (1) and the determined battery power value from Equation (2) in order to determine a fuel and battery energy value. The fuel and battery energy values may represent the amount of energy used by the engine 12 and electric machines 14,40, separately, in order to power the vehicle 10. The fuel energy value may be determined by the controller 54 using the following exemplary equation:

$$Fuel\_Energy = \int_{t_1}^{t_2} Fuel\_Power(dt) \qquad (3)$$

where,
Fuel_Energy is the determined fuel energy value of the vehicle 10; and
Fuel_Power is the fuel power value as determined by Equation (1).

The controller 54 may also calculate the battery energy value using the following exemplary equations:

$$Battery\_Energy = \int_{t_1}^{t_2} Battery\_Power(dt) \qquad (4)$$

where,
Battery_Energy is the determined battery energy value of the vehicle 10; and
Battery_Power is the battery power value as determined by Equation (2).

One or more embodiments of the present application contemplate that fuel and battery energy values are integrated over a power integration period ($t_1$ to $t_2$). As such, the controller 54 may use the power integration period ($t_1$ to $t_2$) in order to determine the fuel and battery energy values.

One or more embodiments of the present application also contemplate that the controller 54 may set the power integration period ($t_1$ to $t_2$) equal to the "short term" time period. As such, the integration time period value used to calculate the fuel and battery energy values will correspond to the "short term" time period. For example, if the "short term" time period is set to five minutes, then the power integration period ($t_1$ to $t_2$) may be set from $t_1$ equal to zero to $t_2$ equal to 5 minutes. Alternatively, if the "short term" energy efficiency value is being determined using a "short term" distance traveled, the power integration period may continue until the "short term" distance traveled is reached.

With reference to the "long term" energy efficiency value, the controller 54 may set the start of the power integration period ($t_1$) as the period of time when the ignition of the vehicle is started. The controller 54 may also set the end of the power integration period ($t_2$) as the "long term" end time value. As such, the "long term" energy efficiency value may be determined using a fuel and battery energy value that may have a power integration period ($t_1$ to $t_2$) equal to the time the ignition of the vehicle is started until the "long term" end time value.

Once the battery and fuel energy values are determined, the flow diagram 100 may proceed to step 150 where a vehicle energy value is determined. The controller 54 may calculate the vehicle energy value using the following exemplary equation:

$$Vehicle\_Energy = Fuel\_Energy + Battery\_Energy \qquad (5)$$

where,
Vehicle_Energy is the determined vehicle energy value;
Fuel_Energy is the fuel energy value as determined by Equation (3); and
Battery_Energy is the battery energy value as determined by Equation (4).

Once the vehicle energy value is determined, the flow diagram 100 may proceed to step 160. In step 160, the controller 54 may use the vehicle energy value in order to calculate an energy used per distance value. The energy used per distance value may be determined by the controller 54 using the following exemplary equation:

$$Energy\_Used\_Per\_Distance = \frac{Vehicle\_Energy}{Distance\_Traveled} \qquad (6)$$

where,
Energy_Used_Per_Distance is the determined energy used per distance value;
Vehicle_Energy is the vehicle energy value as determined by Equation (5); and
Distance_Traveled is a distance traveled value.

As illustrated in Equation (6), the energy used per distance value requires the controller 54 to determine a distance traveled value. One or more embodiments of the present application contemplate that the distance traveled value may be different when the controller is determining the "short term" and "long term" energy efficiency values. For example, if the controller 54 is determining the "short term" energy efficiency value, the distance traveled value may be the integral of the average vehicle speed over the power integration period ($t_1$ to $t_2$) as used in Equations (3) and (4).

On the other hand, if the controller 54 is determining the "long term" energy efficiency value, the distance traveled value may be the total distance traveled by the vehicle from the time the vehicle is turned on until the "long term" end time value. As stated above, the "long term" end time value may be a specified time period or distance traveled value. If the "long term" end time value is a specified time period then the distance traveled may be the integral of the average vehicle speed over that specified time period value. However, if the "long term" end time value is a "long term" distance traveled value, then the distance traveled value is equal to the "long term" distance traveled value. Lastly, if the controller 54 is determining the "long term" energy efficiency from the time the vehicle 10 is turned on until when the vehicle 10 is turned off, the distance traveled value may be the total distance traveled by the vehicle 10 during the period the vehicle 10 is turned on until the vehicle 10 is turned off.

Once the energy used per distance value is determined, the flow diagram 100 may proceed to step 170. In step 170, the controller 54 may determine the overall energy efficiency value. When determining the "short term" energy efficiency value, the controller 54 may use a filter to average the energy used per distance value. The energy used per distance value may be averaged using a predetermined or programmable time period (e.g., a five minute time period) or a specified number of previous energy used per distance values (e.g., a buffer of the previous five energy used per distance values). The controller 54 then may use a look up table that is stored in memory in order to correlate the averaged energy used per distance value to a "short term" energy efficiency value. Once the energy used per distance traveled value is correlated, the controller 54 may transmit the "short term" energy efficiency value to the information display 66. In turn, the information display 66 may modify the number of efficiency indicators 68 displayed in respect to the transmitted "short term" energy efficiency value.

One or more embodiments of the present application also contemplates that the controller 54 may modify the "short term" time period if the vehicle 10 comes to a complete stop but has not been turned off. The controller 54 may modify the "short term" time period because the energy used per distance value may begin to increase thereby correlating into a decreasing "short term" energy efficiency value. As such, the controller 54 may be receive a signal when the vehicle 10 has stopped or nearly stopped and the controller 54 may modify the "short term" time period to minimize the impact of stopping the vehicle on the "short term" energy efficiency. For example, during operation of the vehicle 10, the energy used per distance value may typically be averaged over a 100 sec time period. However, if the controller 54 receives a signal that the vehicle 10 has stopped, the controller 54 may extend the time period to 2000 sec so that the averaged energy used per distance value may not correlate into a rapidly decreasing "short term" energy efficiency value.

With reference to the "long term" energy efficiency value, the controller 54 may determine a "long term" average energy used per distance value based on a rolling "long term" time period or upon a rolling number of previous energy used per distance values (e.g., a rolling buffer of the last five energy used per distance values). Alternatively, the controller 54 may determine the "long term" energy efficiency value based upon an averaged "short term" energy efficiency value. For example, the "long term" energy efficiency value may be determined by averaging the first "short term" energy efficiency value that is determined after the engine 12 is turned on, with each consecutive "short term" energy efficiency value determined until the "long term" end time value is reached.

Once the "long term" end time value is reached, the controller 54 may correlate the averaged energy used per distance value using the look up table in order to determine the "long term" energy efficiency value. The controller 54 may then transmit the "long term" energy efficiency value to the information display 66. The information display 66 may modify the number of efficiency indicators 68 displayed in respect to the transmitted "long term" energy efficiency value.

Figure 4:
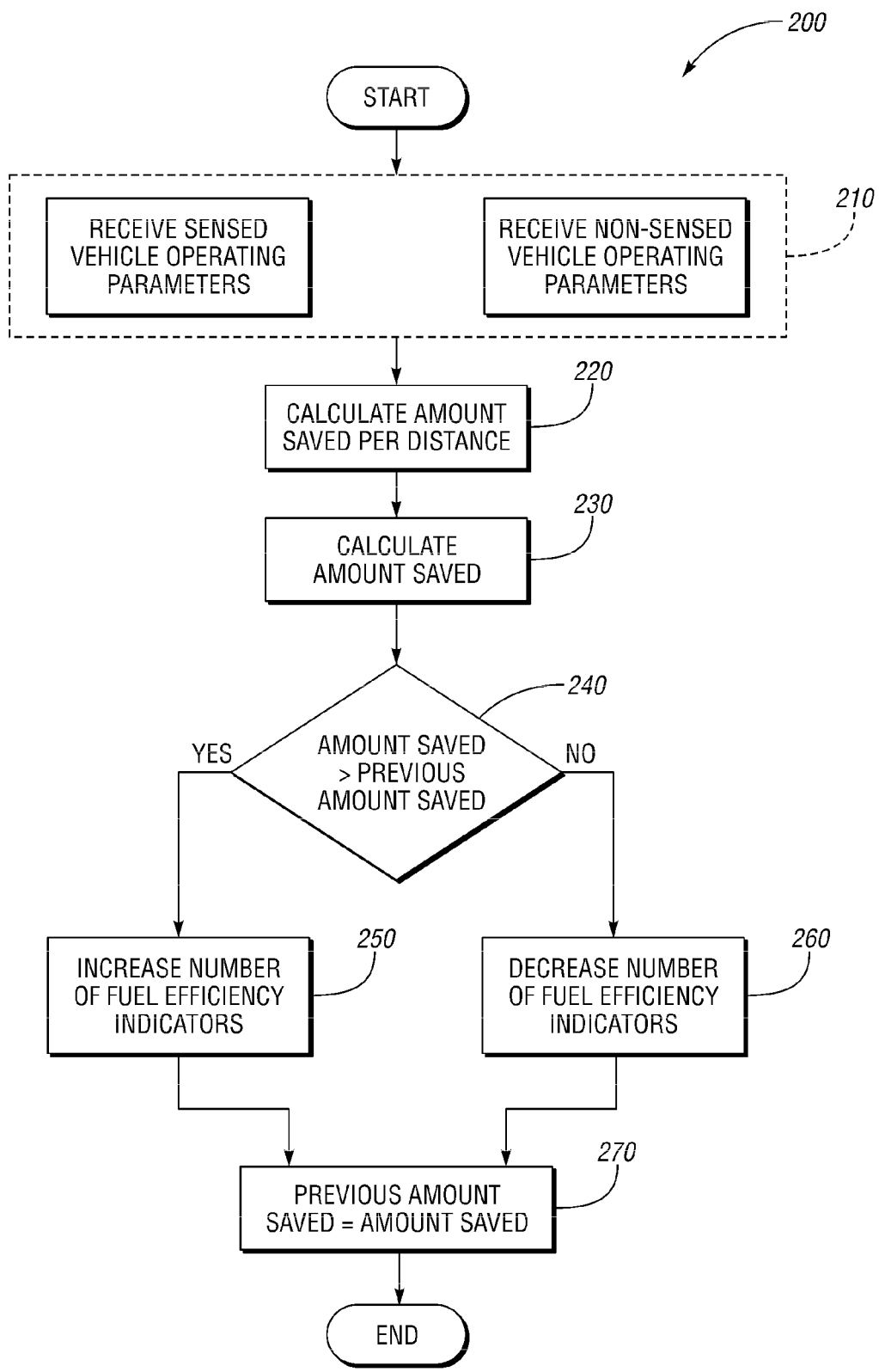
FIG. 4 is an alternate simplified, exemplary flow chart depicting one or more embodiments of the present application described herein.

With reference back to the illustrations, FIG. 4 is an alternative flow diagram 200 demonstrating how the efficiency of the vehicle 10 may be determined. In particular, at step 210 any number of sensed or non-sensed vehicle inputs that correspond to current operating conditions or efficiency of the vehicle 10 may be received. The received inputs may be used by the controller 54 to calculate the efficiency of the vehicle 10 in terms of a monetary amount saved.

Once the sensed and non-sensed vehicle inputs are received, the flow diagram 200 may proceed to step 220. In step 220, the controller 54 may use the sensed and non-sensed vehicle inputs in order to determine an amount of fuel consumed by the vehicle 10 while the vehicle 10 travels a specified distance. In short, the controller 54 may use the sensed and non-sensed vehicle inputs in order to determine a fuel economy of the vehicle 10. Once the fuel economy of the vehicle 10 is determined, the flow diagram 200 may proceed to step 230.

In step 230, a monetary amount saved per distance value may be determined. The monetary amount saved per distance value may be determined using the following exemplary equation:

$$\text{Amount\_Saved\_Per\_Distance} = \left( \frac{1(\text{gallon})}{\text{Compare\_FE}(\text{distance})} - \frac{1(\text{gallon})}{\text{Real\_FE}(\text{distance})} \right) * \text{Fuel\_Price}\left( \frac{\$}{\text{gallon}} \right) \quad (7)$$

where,
Amount_Saved_Per_Distance is the determined monetary amount saved per distance value;
Real_FE is a determined fuel efficiency of the vehicle 10;
Compare_FE is a comparison fuel economy value; and
Fuel_Price is a price per quantity of fuel.

As Equation (7) illustrates, the comparison value (Compare_FE) and the fuel price value (Fuel_Price) cannot be determined using sensed vehicle data or other vehicle fuel efficiency data. As such, one or more embodiments of the present application contemplates that these parameters may be received from any number of external sources. For example, the comparison value and the fuel price values may be preset and stored within the memory of the controller 54.

One or more embodiments of the present application contemplate that the stored comparison value may represent the fuel economy of a second vehicle that has similar characteristics to that of the vehicle 10. For example, if the vehicle 10 is a Ford Escape hybrid, then the comparison value may be a non-hybrid Ford Escape. Alternatively, if the vehicle is a Ford Escape Hybrid, then the comparison value may be a hybrid or non-hybrid small to mid-size sports utility vehicle that is produced by another car manufacturer.

The comparison value and the fuel price value may also be entered into the memory or selected from memory by the driver using a graphical user interface or through a voice activation system such as the Ford Sync voice activation system. By allowing the driver the ability to manually or verbally select or input the fuel price and the comparison value, the driver may be notified how efficiently the vehicle 10 is being operated in comparison to a known second vehicle or a known fuel price. For example, the driver may be able to select a previously owned vehicle as the comparison value and the information display 64 may display the efficiency of the vehicle 10 in comparison to the previously owned vehicle. In addition, the driver may be able to set the fuel price value and determine how efficient the vehicle 10 is being operated at varying fuel prices.

One or more embodiments of the present application also contemplate that the fuel price value may be updated using a wireless system. Some non-limiting examples of the wireless system may include WiFi, Bluetooth, or a cellular source. The controller 54 may use the received fuel price value to update and accurately display the amount saved to the driver on the information display 64. As such, the controller 54 may continually update and modify the information display 64 so as to accurately display how efficiently the driver is operating the vehicle 10.

Once the controller 54 calculates the monetary amount saved per distance value, the flow diagram 200 proceeds to step 240. In step 240, a current total monetary amount saved value is determined using the following equation:

$$\text{Total\_Amount\_Saved} = \text{Amount\_Saved\_Per\_Distance} * \text{Reset\_Value} \quad (8)$$

where,

Total_Amount_Saved is the current total monetary amount saved value;

Amount_Saved_Per_Distance is the monetary amount saved per distance value as determined using Equation (7); and Reset_Value is an event triggered reset value that is input to the controller 54 by the driver.

The reset value (Reset_Value) may be a rolling distance value that may be reset in accordance with a driver defined event. For example, the driver defined event that resets the total monetary amount saved value may be based upon a tank of fuel, a trip, or a period of time (e.g., a week, month, year). The reset value may also be programmable by the driver so that the value resets upon reaching a particular distance or amount of fuel consumed. As such, the reset value may automatically reset once the driver programmed event is reached.

The controller 54 may be capable of storing multiple reset values that are used to calculate multiple total monetary amount saved values. The controller 54 may allow the driver to store and display one or more of the multiple total monetary amount saved values on the information display 66. Thus, the driver would be capable of selecting and displaying the total monetary amount saved value based upon the life of the vehicle 10, a trip counter, when the driver last refueled the vehicle 10, or the like.

One or more embodiments of the present application also contemplate that the controller 54 may be capable of storing multiple total monetary amount saved values. By storing multiple total monetary amount saved values, any number of vehicle drivers may be capable of storing a driver unique total monetary amount saved value. Each driver may then be able to select and display the driver unique total monetary amount saved value that represents the efficiency of that particular driver's vehicle operation. Hence, each driver may be capable of comparing their unique total monetary amount saved value with respect to other driver unique total monetary amount saved values in order to determine how to modify their vehicle operation thereby increasing efficiency.

Once the total monetary amount saved value is determined, the flow diagram 200 may proceed to step 250. In step 250, the controller 54 may determine if the total monetary amount saved value is greater than a previously stored total monetary amount saved value. Depending upon the determination of step 250, the controller 54 modifies the information display 66 so as to increase the number of efficiency indicators 68, as illustrated in step 260, or decrease the number of efficiency indicators 68, as illustrated in step 270. For example, if the total monetary amount saved determined at step 240 is greater than the previously stored total monetary amount saved value, then the number of efficiency indicators 68 may increase (step 260). If however, the total monetary amount saved value is less than the previously stored total monetary amount saved value, then the number of efficiency indicators 68 may decrease (step 270).

For example, suppose:
Real_FE=32 MPG;
Compare_FE=22 MPG; and
Fuel_Price=$3.50 per gallon;

then, $$\text{Amount\_Saved\_Per\_Distance} = \left(\frac{1}{22} - \frac{1}{32}\right) * 3.5; \text{ and}$$

Amount_Saved_Per_Distance = $.0497 per mile.

With reference to the above example, if the reset value is set to 100 miles, then the controller 54 would calculate that the total monetary amount saved value to be $4.97. If the controller 54 had determined a previous total monetary amount saved value to be $4.50, then the controller 54 would modify the information display 66 to illustrate more efficiency indicators 68, as shown in step 260.

Conversely, if the controller 54 had determined the previous total monetary amount saved value to be $5.03, then the controller 54 would modify the information display 66 to illustrate less efficiency indicators 68, as shown in step 270. Once the information display 66 is modified to illustrate a representative amount of efficiency indicators 68, the flow diagram 200 may proceed to step 180 where the controller 54 stores the current total monetary amount saved value as the previous total monetary amount saved value.

Both flow diagram 100 and flow diagram 200 operate so as to consistently update the information display 66. In turn, the driver may modify vehicle operation so that the number of efficiency indicators 68 indicated upon the information display 66 increases. Thus, as the driver attempts to increase the number of efficiency indicators 66, the driver learns how to operate the vehicle in the most energy efficient manner.

It should be noted that the methods of FIGS. 3-4 as described herein are exemplary only, and that the functions or steps of the methods could be undertaken other than in the order described and/or simultaneously as may be desired, permitted and/or possible.

While the best mode for carrying out the invention has been described in detail, those familiar with the art to which this invention relates will recognize various alternative designs and embodiments for practicing the invention as defined by the following claims.

What is claimed:

1. An information display system comprising:
an information display configured to display a number of efficiency indicators; and
a controller configured to receive information related to an amount of electrical energy used to propel a vehicle, determine an energy efficiency value based upon the amount of electrical energy used, and transmit the energy efficiency value so that the information display displays the number of efficiency indicators based upon the energy efficiency value.

2. The information display system of claim 1, wherein the controller is further configured to receive information related to a predetermined time period and determine the energy efficiency value based on the predetermined time period.

3. The information display system of claim 1, wherein the controller is further configured to receive information related to a predetermined travel distance and determine the energy efficiency value based on the predetermined travel distance.

4. The information display system of claim 1, wherein the controller is further configured to determine the energy efficiency value from a time when the vehicle is turned on until the time the vehicle is turned off.

5. The information display system of claim 1, further comprising a driver interface system configured to receive a specified time period or a specified travel distance and transmit the specified time period or specified travel distance to the controller, wherein the controller determines the energy efficiency value based upon the specified time period or the specified travel distance.

6. The information display system of claim 5, further comprising a memory used to store the specified time period and the specified travel distance, and the controller further being configured to retrieve the specified time period and the specified travel distance from the memory.

7. The information display system of claim 1, wherein the controller is further configured to receive information related to a predetermined time period and determine the energy efficiency value from a time after the vehicle is turned on until the predetermined time period has elapsed.

8. The information display system of claim 1, wherein the controller is further configured to receive information related to a predetermined distance and determine the energy efficiency value from a time after the vehicle is turned on until the predetermined distance has been traveled by the vehicle.

9. The information display system of claim 7, wherein the predetermined time period is specified by a user.

10. The information display system of claim 8, wherein the predetermined distance is specified by a user.

11. A method comprising:
receiving information related to an amount of electrical energy used in order to propel a vehicle;
determining an energy efficiency value using the electrical energy used information;
transmitting the energy efficiency value to an information display; and
displaying a number of efficiency indicators on the information display based on the energy efficiency value.

12. The method of claim 11, wherein the step of receiving information related to an amount of electrical energy used comprises receiving information related to a battery voltage and a battery current, and the step of determining an energy efficiency value comprises determining a battery power value using the received battery voltage and battery current information.

13. The method of claim 12, wherein the step of determining an energy efficiency value further comprises determining a battery energy value using the determined battery power value.

14. The method of claim 13, wherein the step of determining an energy efficiency value further comprises determining a vehicle energy value using the battery energy value.

15. The method of claim 14, wherein the step of determining an energy efficiency value further comprises determining an energy used per distance value using the vehicle energy value and a distance traveled value.

16. The method of claim 15, wherein the step of determining an energy efficiency value further comprises determining the energy efficiency value by averaging any number of previous energy used per distance values.

17. The method of claim 16, wherein the step of determining the overall energy efficiency value by averaging any number of previous energy used per distance values comprises determining the energy efficiency when the speed of the vehicle is below a speed threshold value and increasing the averaged number of previous energy used per distance values.

18. The method of claim 17, further comprising storing in a memory the average energy efficiency value, and the step of transmitting the energy efficiency value to an information display comprises transmitting the average energy efficiency value to the information display.

* * * * *